Figure 1:
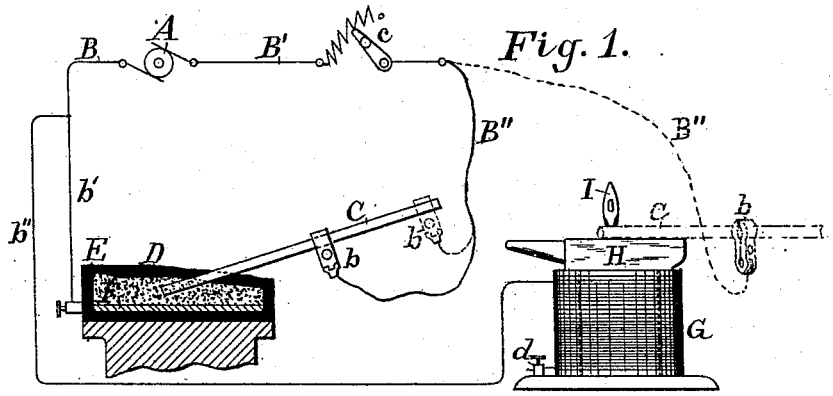

(No Model.)

M. W. DEWEY.
METHOD OF ELECTRIC WELDING AND METAL WORKING.

No. 441,401. Patented Nov. 25, 1890.

WITNESSES:
J. J. Laass.
H. M. Beamans.

INVENTOR:
Mark W. Dewey,
By Duell, Laass & Duell,
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC WELDING AND METAL-WORKING.

SPECIFICATION forming part of Letters Patent No. 441,401, dated November 25, 1890.

Application filed September 5, 1890. Serial No. 364,088. (No specimens.)

*To all whom it may concern:*

Be it known that I, MARK W. DEWEY, of Syracuse, in the county of Onondaga and State of New York, have invented new and useful Improvements in Methods of Electric Welding and Metal-Working, (Case No. 73,) of which the following, taken in connection with the accompanying drawings, is a full, clear, and exact description.
My invention relates to those processes of electric welding and metal-working in which a yielding bed of conducting material is employed, and also to those processes in which magnetism is utilized, and is similar in some respects to my methods of metal-working set forth and claimed in my prior patents, Nos. 408,875 and 436,519, of August 13, 1889, and September 16, 1890, respectively.

The objects of my invention are, first, to heat a bar or blank by passing an electric current through a yielding bed of conducting material from the said bar or article embedded therein to a terminal of an electric generator in contact with said bed; second, to subject one or more bars or blanks while embedded to magnetism; third, to keep the bar or blank heated while it is worked upon an anvil by passing a current through the bar and anvil while both are connected in circuit, and, fourth, to magnetize the anvil upon which the welding or working operation is performed to obtain the effects and superior results produced by magnetism upon the work.

To this end my invention consists in connecting the said bar or blank with one terminal of an electric generator, embedding the portion of the bar or blank to be worked in in a yielding bed of conducting material in connection with the other terminal, and passing a suitable heating-current through the bar or blank or a portion thereof and the yielding bed.

My invention consists, also, in connecting the said bar or blank with one terminal of an electric generator, bringing an end or other portion of the bar or blank to be worked in contact with a pole of a magnet, passing a heating-current through and between the bar or blank and the magnet, and then applying pressure or force to work the same while under the influence of the magnet; and my invention consists, further, in connecting the bars or blanks to be welded together to one terminal of an electric generator, bringing the ends or other desired portions of the bars or blanks to be welded together in contact with a yielding bed of conducting material connected to the other terminal of the generator, placing the ends or parts to be welded together in contact with each other, and then applying force to unite the parts.

My invention also consists in certain other combinations of steps in the method hereinafter described, and specifically set forth in the claims.

Figure 2:
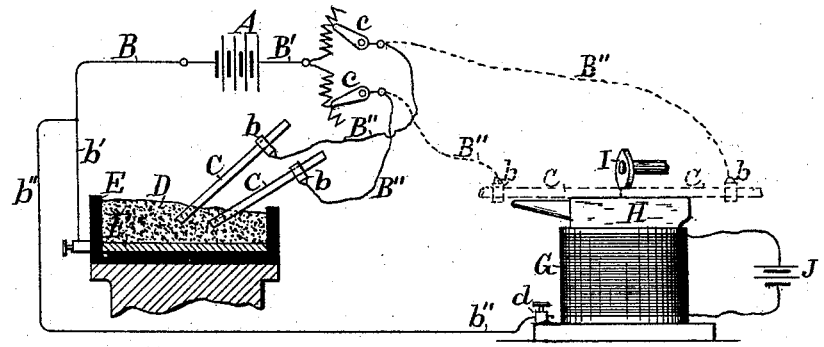
Figure 3:
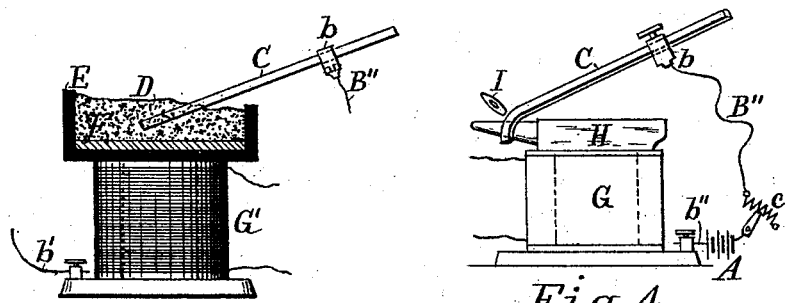
Figure 4:
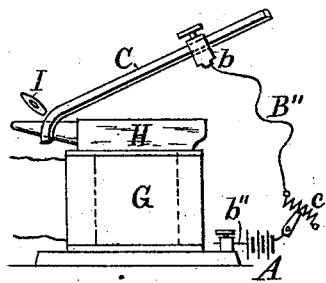

In the drawings, Figure 1 represents apparatus, partly in section, for practicing my method. Fig. 2 shows similar apparatus more particularly adapted for welding purposes. Fig. 3 shows a yielding bed supported upon a pole of a magnet, and Fig. 4 represents a bar being worked or bent upon a magnetic anvil.

Referring specifically to the drawings, A indicates an electric generator or source of heating-current. B and B' are conductors extending therefrom.

B'' are flexible conductors leading to clamps *b*, connected to the bars or blanks C, embedded in the yielding conducting-bed D, formed of carbon or other suitable material, supported in a receptacle E, of non-conducting material, as fire-brick or asbestus.

F is a conducting-plate in the bottom of the receptacle E and in contact with the bed, and *b'* is a conductor connecting the plate with the conductor B.

*b''* is a conductor leading from the conductor B to a terminal of the coil G around the anvil H, or to the base of the said anvil, and I is a hammer shown to illustrate means for applying force or pressure to the work, although other suitable tools or means may be employed therefor, if desired.

In Fig. 1, *c* is an adjustable resistance to regulate the current flowing through the bar C. The clamp *b* is preferably placed near the middle of the bar when the latter is to be heated at the end, so that the other end will remain cool to allow handling; but the said clamp may be connected to the bar at the end, if desired, as shown in dotted lines in the figure, or at any other part of the bar.

The flexible connection B'' allows the bar or blank to be moved universally or to any desired position during the heating or working thereof.

When using the apparatus shown in Fig. 1 to practice my method, the bar C is suitably connected to one terminal of the generator A by the clamp b. The end or other portion of the bar to be heated is embedded in the yielding bed D, thus closing the circuit through the bed and permitting the current to pass through said bed and the bar, or a portion thereof, until it is sufficiently heated. The part of the bar embedded will be quickly heated, although of low resistance, as the bed may offer greater resistance to the current. After the bar is sufficiently heated or softened it is removed from the bed and placed upon the anvil H, thereby interrupting the current through the bed and passing it through the anvil H and coil G, as one terminal d of the coil is connected to the base of the anvil. While upon the anvil the bar is handled or turned in any position and hammered or subjected to suitable pressure or force to work or shape the same as desired, and is also subjected to the magnetism created by the coil G around the anvil.

In Fig. 2 two bars C are shown partly embedded preparatory to being united or welded together upon an anvil, as indicated by dotted lines in the figure. In this case two clamps b, two flexible connections B'', and two adjustable resistances c are employed. Two resistances are employed, so that the current can be equally or unequally divided, as required, between the two bars C C. In this figure the coil G is shown in circuit with an auxiliary source of electricity J.

In order to subject the bar C while embedded to magnetism, the bed D is placed upon a pole of a magnet, as shown in Fig. 3. In this case the plate F is in electrical connection with the core, which forms a part of the base, which in turn is connected to the conductor b'. The coil G' may be included in the same circuit with the bar or in a separate circuit.

In Fig. 4 the bar C is shown as being heated and bent upon a magnetic anvil.

It will be obvious that in some cases, at least, when some materials are to be worked or welded, it will be unnecessary to heat them in a yielding bed, as the heat generated by the current passing through them when they are brought in contact with the anvil will be sufficient to soften them, so that they may be easily worked or shaped as desired.

Having described my invention, what I claim as new, and desire to secure by Letters Patent, is—

1. The herein-described method for electrically heating a bar or blank for welding or working purposes, consisting in connecting the said bar or blank with one terminal of an electric generator, embedding the portion of the bar or blank to be worked in a yielding bed of conducting material in connection with the other terminal, and passing a suitable heating-current through the bar or blank or a portion thereof and the yielding bed.

2. The herein-described method for electrically heating a bar or blank for welding or working purposes, consisting in connecting the said bar or blank with one terminal of an electric generator, embedding the portion of the bar or blank to be worked in a yielding bed of conducting material in connection with the other terminal, passing a suitable heating-current through the bar or blank or a portion thereof and the yielding bed and subjecting a portion of the bar or blank to magnetism.

3. The herein-described method for electrically heating a bar or blank for welding or working purposes, consisting in connecting the said bar or blank with a universally-movable terminal of an electric generator, embedding the portion of the bar or blank to be worked in a yielding bed of conducting material in connection with the other terminal, and passing a suitable heating-current through the bar or blank or a portion thereof and the yielding bed.

4. The herein-described method for electrically heating a bar or blank for welding or working purposes, consisting in connecting the said bar or blank with one terminal of an electric generator, embedding the portion of the bar or blank to be worked in a yielding bed of conducting material in connection with the other terminal, passing a suitable heating-current through the bar or blank or a portion thereof and the yielding bed until sufficiently heated, and then removing the bar or blank from the bed and performing the operation desired upon the same.

5. The herein-described method for electrically heating a bar or blank for welding or working purposes, consisting in connecting the said bar or blank with one terminal of an electric generator, embedding the portion of the bar or blank to be worked in a yielding bed of conducting material in connection with the other terminal, passing a suitable heating-current through the bar or blank or a portion thereof and the yielding bed until sufficiently heated, and then removing the bar or blank from the bed and performing the operation desired upon the same while upon a magnet.

6. The herein-described method for electrically heating a bar or blank for welding or working purposes, consisting in connecting the said bar or blank with one terminal of an electric generator, embedding the portion of the bar or blank to be worked in a yielding bed of conducting material in connection with the other terminal, passing a suitable heating-current through the bar or blank or a portion thereof and the yielding bed until sufficiently heated, and then removing the bar or blank from the bed and applying pressure or force to work the same while under the influence of magnetism or upon a magnetic anvil.

7. The method of electrically heating and welding or working metal bars or blanks, consisting in connecting the said bar or blank with one terminal of an electric generator, bringing an end or other portion of the bar or blank to be worked in contact with a pole of a magnet, passing a heating-current through and between the bar or blank and the magnet, and then applying pressure or force to work the same while under the influence of the magnet.

8. The method of electrically heating and welding or working metal bars or blanks, consisting in connecting a bar or blank with one terminal of an electric generator, bringing an end or other portion of the bar or blank to be worked in contact with a pole of a magnetic anvil in connection with the other terminal of the generator, passing a heating-current through and between the bar or blank and the magnetic anvil, and applying pressure or force to weld or work the bar or blank while upon the said anvil.

9. The method of electrically heating and welding or working metal bars or blanks, consisting in connecting a bar or blank with the terminals of an electric generator, passing a heating-current through the bar or blank, bringing the latter in contact with a magnetic anvil, and then applying force to weld or otherwise work the said bar or blank.

10. The method of electrically heating and welding or working metal bars or blanks, consisting in connecting a bar or blank with the terminals of an electric generator, passing a heating-current through the bar or blank, bringing the latter in contact with a magnetic anvil, and then applying force to weld or otherwise work the said bar or blank while handling and moving the latter, as desired.

11. The method of electrically heating and welding or working metal bars or blanks, consisting in connecting the bars or blanks to be welded together to one terminal of an electric generator, bringing the ends or other desired portions of the bars or blanks to be welded together in contact with a yielding bed of conducting material connected to the other terminal of the generator, placing the ends or parts to be welded together in contact with each other, and then applying force to unite the parts.

12. The method of electrically heating and welding or working metal bars or blanks, consisting in connecting the bars or blanks to be welded together to one terminal of an electric generator, bringing the ends or other desired portions of the bars or blanks to be welded together in contact with a yielding bed of conducting material connected to the other terminal of the generator, placing the ends or parts to be welded together in contact with each other, and then applying force to unite the parts while under the influence of a magnet.

In testimony whereof I have hereunto signed my name this 1st day of September, 1890.

MARK W. DEWEY. [L. S.]

Witnesses:
C. H. DUELL,
C. L. BENDIXON.